US012597620B2

(12) United States Patent
Park

(10) Patent No.: US 12,597,620 B2
(45) Date of Patent: Apr. 7, 2026

(54) FUEL CELL SYSTEM HAVING AN AIR COMPRESSOR AND A DRIVING CONTROL METHOD FOR A MOTOR OF THE AIR COMPRESSOR

(71) Applicants: HYUNDAI MOTOR COMPANY, Seoul (KR); KIA CORPORATION, Seoul (KR)

(72) Inventor: Min Gu Park, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 232 days.

(21) Appl. No.: 18/198,874

(22) Filed: May 18, 2023

(65) Prior Publication Data

US 2024/0170700 A1 May 23, 2024

(30) Foreign Application Priority Data

Nov. 21, 2022 (KR) ........................ 10-2022-0156552

(51) Int. Cl.
| | |
|---|---|
| *H01M 8/04746* | (2016.01) |
| *F04D 25/06* | (2006.01) |
| *F04D 27/00* | (2006.01) |
| *F04D 27/02* | (2006.01) |
| *H01M 8/0432* | (2016.01) |
| *H01M 8/0438* | (2016.01) |

(52) U.S. Cl.
CPC ........ *H01M 8/04776* (2013.01); *F04D 25/06* (2013.01); *F04D 27/001* (2013.01); *F04D 27/004* (2013.01); *F04D 27/008* (2013.01); *F04D 27/0261* (2013.01); *H01M 8/04373* (2013.01); *H01M 8/04425* (2013.01); *H01M 2250/20* (2013.01); *Y02E 60/50* (2013.01); *Y02T 90/40* (2013.01)

(58) Field of Classification Search
CPC ......... H01M 8/04776; H01M 8/04425; H01M 8/04373; H01M 2250/20; Y02E 60/50; F04D 27/001; F04D 27/004; F04D 27/008; F04D 27/0261; F04D 25/06; Y02T 90/40
See application file for complete search history.

(56) References Cited

U.S. PATENT DOCUMENTS

| | | | | |
|---|---|---|---|---|
| 8,158,293 B2 * | 4/2012 | Naganuma | .............. | B60L 58/33 |
| | | | | 429/513 |
| 8,594,874 B2 * | 11/2013 | Katano | ................... | B60L 58/30 |
| | | | | 429/432 |
| 8,691,453 B2 * | 4/2014 | Kanie | .............. | H01M 8/04089 |
| | | | | 429/444 |
| 8,765,316 B2 * | 7/2014 | Naganuma | ........ | H01M 8/04738 |
| | | | | 429/429 |
| 10,665,875 B2 * | 5/2020 | Farnsworth | ....... | H01M 8/04992 |

* cited by examiner

*Primary Examiner* — Peter J Bertheaud
(74) *Attorney, Agent, or Firm* — Lempia Summerfield Katz LLC

(57) ABSTRACT

A driving control method for a motor of an air compressor is provided and includes: controlling driving of the motor based on a speed command for the motor of the air compressor and a current rotational speed of the motor; and controlling driving of the motor based on the speed command and an expected rotational speed of the motor when an anomaly occurs in determining the current rotational speed. In particular, the expected rotational speed is determined based on a rotational speed map regarding the motor, an air flow rate sensing value and an air pressure sensing value.

8 Claims, 7 Drawing Sheets

Figure 4:
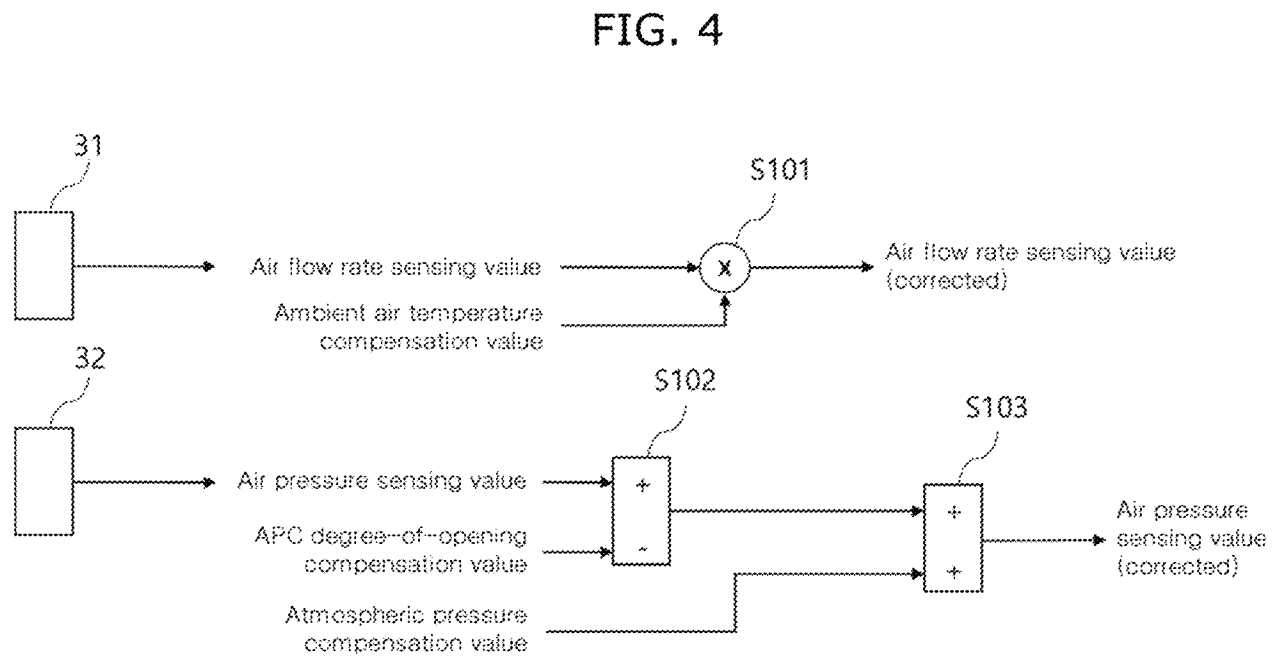

Air flow rate sensing value

Ambient air temperature compensation value

S101

×

Air flow rate sensing value (corrected)

32

Air pressure sensing value

APC degree-of-opening compensation value

Atmospheric pressure compensation value

S102

+    −

S103

+    +

Air pressure sensing value (corrected)

FUEL CELL SYSTEM HAVING AN AIR COMPRESSOR AND A DRIVING CONTROL METHOD FOR A MOTOR OF THE AIR COMPRESSOR

CROSS-REFERENCE TO RELATED APPLICATION(S)

This application claims the benefit of and priority under 35 U.S.C. 119 to Korean Patent Application No. 10-2022-0156552, filed on Nov. 21, 2022, the disclosure of which is herein incorporated by reference in its entirety.

BACKGROUND

1. Technical Field

The present disclosure relates to a fuel cell system having an air compressor and a driving control method for a motor included in the air compressor.

2. Description of the Related Art

Induction motors are used in various fields and, particularly, used for air compressors of fuel cell vehicles. An air compressor used for a fuel cell system may include an inverter and a motor, which are integrated to reduce the weight and package size of the air supply system. Such an integrated air compressor may be configured such that a position of a rotor (e.g., a permanent magnet) is estimated without a position sensor such as a Hall sensor, namely for a sensorless control scheme. According to the sensorless control scheme, the position of the rotor is generally determined by using a counter electromotive force of the motor. However, if a motor of the sensorless air compressor is controlled at a high rotational speed for the purpose of a high output of the fuel cell, an overcurrent may occur in the sensorless air compressor. This causes an anomaly in connection with determining position of the rotor.

The statements in this BACKGROUND section merely provide background information related to the present disclosure and may not constitute prior art.

SUMMARY

The present disclosure providers a method to control driving of a motor based on an expected rotational speed of the motor according to an air flow rate value and an air pressure value when an anomaly occurs in connection with determining a current rotational speed of the motor, for example, when an overcurrent occurs in an air compressor having the motor.

The technical subjects pursued in the present disclosure may not be limited to the above mentioned technical subjects, and other technical subjects which are not mentioned may be clearly understood, through the following descriptions, by those having ordinary skill in the art to which the present disclosure pertains.

In an aspect of the present disclosure, a driving control method for a motor of an air compressor may include: controlling, based on a speed command regarding a motor of an air compressor and a current rotational speed of the motor, driving of the motor; and controlling driving of the motor, based on the speed command and an expected rotational speed of the motor, when an anomaly occurs in connection with determining the current rotational speed. In particular, the expected rotational speed is determined, based on a rotational speed map of the motor, an air flow rate sensing value and an air pressure sensing value.

In another aspect of the present disclosure, a fuel cell system may include: a fuel cell stack; an air compressor including a motor such that introduced air is compressed and supplied to the fuel cell stack; and a first controller configured to control driving of the motor, based on a speed command regarding the motor and a current rotational speed of the motor, such that when an anomaly occurs in connection with determining the current rotational speed, driving of the motor is controlled, based on the speed command and an expected rotational speed of the motor. The fuel cell system further includes a second controller configured to transmit the speed command and the expected rotational speed to the first control unit and determine, based on a rotational speed map of the motor, the expected rotational speed according to an air flow rate sensing value and an air pressure sensing value.

The present disclosure is advantageous in that, when an anomaly occurs in determining the current rotational speed of the motor (for example, when an overcurrent occurs in an air compressor), driving of the motor is controlled on the basis of an expected rotational speed of the motor. Thus, even when an anomaly occurs in connection with determining the current rotational speed of the motor, the rotational speed of the motor can be controlled without stopping the driving of the motor.

Advantageous effects obtainable from the present disclosure may not be limited to the above mentioned effects, and other effects which are not mentioned may be clearly understood, through the following descriptions, by those having ordinary skill in the art to which the present disclosure pertains.

BRIEF DESCRIPTION OF THE DRAWINGS

The accompanying drawings attached herein illustrate embodiments of the present disclosure so as to facilitate understanding of the technical idea of the present disclosure together with the following detailed description of the present disclosure, and the present disclosure is not to be interpreted as being limited to such drawings:

FIG. 1 is a block diagram illustrating the configuration of an air supply control system included in a fuel cell system according to an embodiment of the present disclosure;

FIG. 2 is a circuit diagram of a rotor detecting circuit for detecting the position of a motor rotor included in an air compressor according to an embodiment of the present disclosure;

FIG. 3 is a block diagram illustrating the configuration of a control system of an air compressor according to an embodiment of the present disclosure;

FIG. 4 illustrates a process in which a fuel cell control unit corrects an air flow rate sensing value and an air pressure sensing value according to an embodiment of the present disclosure;

DETAILED DESCRIPTION

Figure 5:
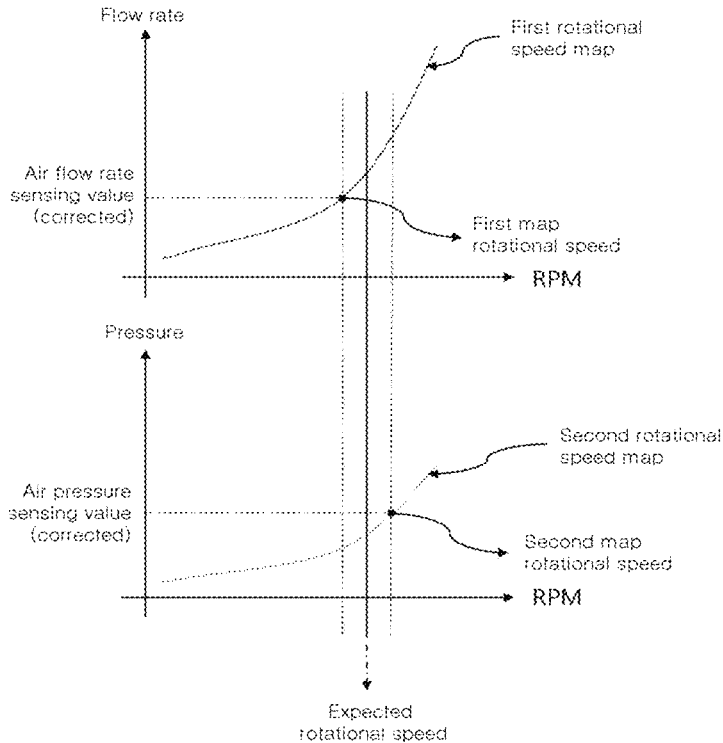
FIG. 5 illustrates a process in which a fuel cell control unit according to an embodiment of the present disclosure determines an expected motor rotational speed with reference to a rotational speed map.

Hereinafter, embodiments disclosed in the present specification are described in detail with reference to the accompanying drawings, and the same or similar elements are given the same and similar reference numerals, so duplicate descriptions thereof have been omitted.

In describing the embodiments disclosed in the present specification, when the detailed descriptions of the relevant known technology are determined to unnecessarily obscure the gist of the present disclosure, the detailed descriptions have been omitted. Furthermore, the accompanying drawings are provided only to assist in understanding the embodiments disclosed in the present specification, and the technical spirit disclosed herein is not limited to the accompanying drawings, and it should be understood that all changes, equivalents, or substitutes thereof are included in the spirit and scope of the present disclosure.

In the following description of the embodiments, the term "predetermined" implies that when a parameter is used in a process or algorithm, the parameter has a previously determined numerical value. The numerical value of the parameter may be set at the beginning of the process or algorithm or during an interval when the process or algorithm is performed.

Terms including an ordinal number such as "first", "second", or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween. A singular expression may include a plural expression unless they are definitely different in a context. When a component, device, element, or the like of the present disclosure is described as having a purpose or performing an operation, function, or the like, the component, device, or element should be considered herein as being "configured to" meet that purpose or to perform that operation or function.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

A unit or a control unit included in a name such as a fuel cell control unit (FCU) is merely a term widely used for naming a controller configured to control a specific function of a vehicle, but does not mean a generic function unit. For example, each controller may include a communication device configured to communicate with a sensor or another control unit, a memory configured to store an operation system, a logic command, or input/output information, and at least one processor configured to perform determination, calculation, decision or the like which are required for responsible function controlling.

Figure 1:
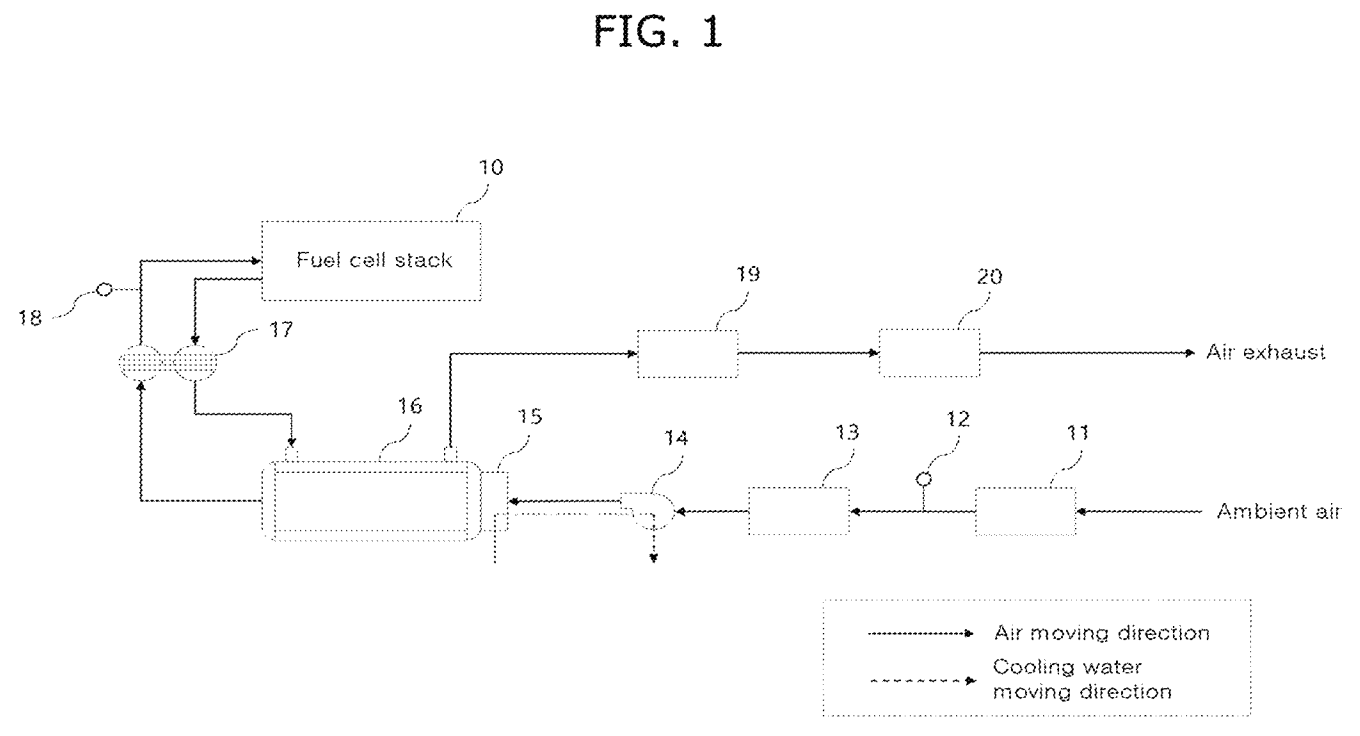

FIG. 1 is a block diagram illustrating the configuration of an air supply control system included in a fuel cell system according to an embodiment of the present disclosure.

As illustrated in FIG. 1, the fuel cell system may include: a fuel cell stack 10; an air intake filter 11; an air flow sensor 12; an air intake silencer 13; an air compressor 14; an air cooler 15; an air humidifier 16; an air cut-off valve 17; an air pressure sensor 18; an air pressure controller 19; and an air exhaust silencer 20.

The fuel cell stack 10 has multiple fuel cell cells stacked on one another, and may have an anode (fuel electrode) to which hydrogen is supplied from a hydrogen tank (not illustrated) and a cathode (air electrode) to which ambient air is supplied through the air compressor 14.

The air intake filter 11 may filter out foreign materials (for example, dust) from ambient air.

The air flow sensor 12 may measure the flow rate value of ambient air flowing in through the air intake filter 11 and may output an air flow rate sensing value corresponding to the measured flow rate value.

The air intake silencer 13 may remove air intake noise when ambient air flows in.

The air compressor 14 may include a motor for compressing air that has flowed in the compressor, and the motor supplies the compressed air to the cathode of the fuel cell stack 10 through the air humidifier 16.

The air cooler 15 may be configured to cool air supplied to the air humidifier 16.

The air humidifier 16 may adjust the humidity of air.

The air cut-off valve 17 may cut off the flow of air in the fuel cell stack 10.

The air pressure sensor 18 may be disposed between the air cut-off valve 17 and the entrance of the fuel cell stack 10 and may measure the pressure of ambient air flowing in through the air cut-off valve 17. The air pressure sensor 18 may output an air pressure sensing value corresponding to the measured pressure of the ambient air.

The air pressure controller (APC) 19 may discharge exhaust gas (unreacted hydrogen, oxygen, and the like) discharged from the cathode of the fuel cell stack 10 to the outside through air exhaust line.

The air exhaust silencer 20 may remove noise occurring when exhaust gas is discharged through the air exhaust line.

Figure 2:
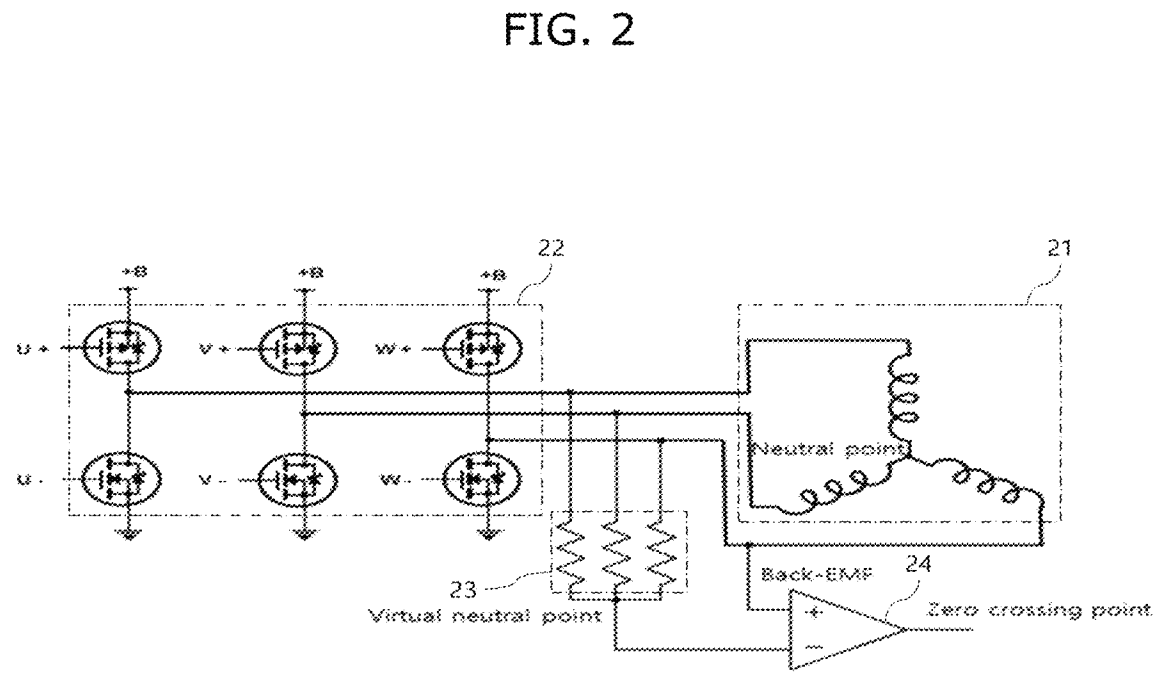

FIG. 2 is a circuit diagram of a rotor detecting circuit for detecting the position of a motor rotor included in an air compressor according to an embodiment of the present disclosure.

As illustrated in FIG. 2, the rotor detecting circuit may include a motor 21, an inverter 22, multiple resistors 23, and a comparator 24. The motor 21 is included in the air compressor 14 (FIG. 1). The inverter 22, the multiple resistors 23, and the comparator 24 may be disposed inside or outside the air compressor 14, depending on desired embodiments.

The motor 21 may have multiple windings corresponding to multiple phases, respectively, and the multiple windings may form a neutral point.

The inverter 22 includes multiple legs connected to a DC terminal to which a DC voltage +B is applied, and the inverter 22 may receive switching signals U+, U−, V+, V−, W+, W− which are input thereto, and may provide AC voltages corresponding to the multiple phases, respectively, to the motor 21.

One ends of the multiple resistors 23 may be connected to different ones among AC terminals of the inverter 22, respectively, and the other ends of the multiple resistors 23 may be interconnected to form a virtual neutral point.

The comparator 24 may compare the counter electromotive force (back-EMF) of the motor 21 with the voltage of the virtual neutral point, and may detect a zero-crossing point corresponding to zero ("0") V according to the result of comparison.

The air compressor 14 according to the present embodiment may be implemented as a sensorless air compressor having no position sensor for detecting the rotor position. Accordingly, in order to estimate the current rotational speed (for example, revolutions per minute "RPM") of the air compressor 14 with regard to the motor 21, the counter electromotive force waveform may be used instead of the position sensor to identify the rotor position of the motor 21.

However, if a high output is required from the motor of the sensorless air compressor, the occurrence of overcurrent may disturb the determination of the current rotational speed of the motor. For example, if an overcurrent occurs in the sensorless air compressor, temporary power cut-off may make it impossible to recognize the current rotational speed of the motor on the basis of the counter electromotive force waveform. The current rotational speed of the motor is desired to control the motor speed, and motor operation may thus stop in a range in which the air compressor is powered off.

In one embodiment of the present, if there is an anomaly in determining the current rotational speed of the motor of the air compressor, the expected motor rotational speed is determined according to the air flow rate sensing value and the air pressure sensing value, and driving the motor is controlled according to the determined expected rotational speed.

Figure 3:
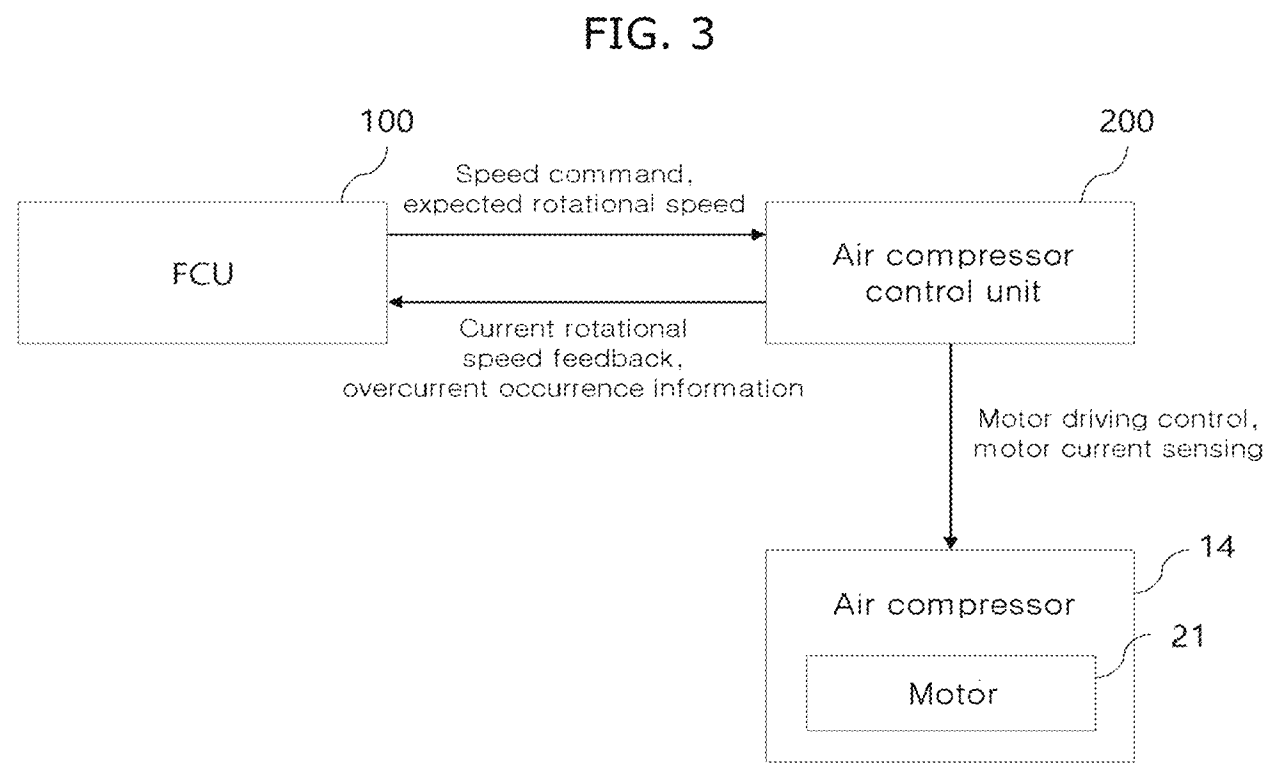

FIG. 3 is a block diagram illustrating the configuration of a control system of an air compressor according to an embodiment of the present disclosure.

As illustrated in FIG. 3, the control system of the air compressor may include a fuel cell control unit (FCU) 100 and an air compressor control unit 200.

The fuel cell control unit 100 may transmit a command regarding the speed of the motor 21 to the air compressor control unit 200.

The air compressor control unit 200 may control driving of the motor 21 on the basis of the command for the speed of the motor 21 and the current rotational speed of the motor 21.

The air compressor control unit 200 may estimate the current rotational speed of the motor 21 based on the counter electromotive force of the motor 21 included in the air compressor 14, and may feedback the current rotational speed of the motor 21 to the fuel cell control unit 100.

The air compressor control unit 200 may sense the electric current in the motor 21 so as to determine whether or not an overcurrent has occurred in the air compressor 14. If an overcurrent has occurred in the air compressor 14, the air compressor control unit 200 may stop the operation of estimating the current rotational speed of the motor 21 in order to protect the motor 21 from the overcurrent.

If an overcurrent has occurred in the air compressor 14, the air compressor control unit 200 may transmit information of overcurrent occurrence to the fuel cell control unit 100, and the fuel cell control unit 100 may thereby recognize that an overcurrent has occurred in the air compressor 14.

If an overcurrent has occurred in the air compressor 14, in other words, when an anomaly has occurred in determining the current rotational speed of the motor 21, the fuel cell control unit 100 may determine the expected rotational speed of the motor 21 on the basis of an air flow rate sensing value output from the air flow sensor 12 (FIG. 1) and an air pressure sensing value output from the air pressure sensor 18 (FIG. 1). The fuel cell control unit 100 may transmit the result of determination (i.e., the expected rotational speed) to the air compressor control unit 200.

The fuel cell control unit 100 may monitor the current rotational speed of the motor 21, the air flow rate sensing value, and the air pressure sensing value before an overcurrent occurs in the air compressor 14. Based on the monitored information, the fuel cell control unit 100 may generate a rotational speed map.

The rotational speed map may include a first rotational speed map and a second rotational speed map. The first rotational speed map may include information regarding the rotational speeds of the motor 21 corresponding to the air flow rate values, and the second rotational speed map may include information regarding the rotational speeds of the motor 21 corresponding to the air pressure values. Since the air flow rate changes according to the ambient air temperature, the first rotational speed map may be implemented as a 3D map regarding the air flow rate value, the ambient air temperature, and the motor rotational speed, depending on the embodiment. In another form, the first rotational speed may be implemented as a 2D map regarding the air flow rate value and the motor rotational speed with regard to each ambient air temperature. Likewise, the air pressure changes according to the degree of opening of the APC and the atmospheric pressure, and the second rotational speed map may thus reflect the degree of opening of the APC and the atmospheric pressure. The air pressure changes according to the ambient air temperature, and the second rotational speed map may thus reflect the ambient air temperature. When the air pressure sensor 18 is positioned at the entrance of the fuel cell stack 10 as illustrated in FIG. 1, the ambient air temperature is reflected in the air pressure sensing value, and the second rotational speed map may not reflect the ambient air temperature.

The fuel cell control unit 100 may determine the expected rotational speed of the motor 21 according to the air flow rate sensing value and the air pressure sensing value measured at the timepoint at which an anomaly occurs in connection with determining the current rotational speed (i.e., when an overcurrent occurs in the air compressor) on the basis of the rotational speed map of the motor 21.

The fuel cell control unit 100 may determine, with reference to the first rotational speed map, that the rotational speed of the motor 21 corresponding to the air flow rate sensing value is a first map rotational speed. The fuel cell control unit 100 may determine, with reference to the second rotational speed map, that the rotational speed of the motor 21 corresponding to the air pressure sensing value is a second map rotational speed. The fuel cell control unit 100 may then configure the average of the first map rotational speed and the second map rotational speed as the expected rotational speed of the motor 21.

The fuel cell control unit 100 may correct the air flow rate sensing value and the air pressure sensing value, may determine the first expected rotational speed according to the corrected air flow rate sensing value with reference to the first rotational speed map. The fuel cell control unit 100 may also determine the second expected rotational speed according to the corrected air pressure sensing value with reference to the second rotational speed map.

The process in which the fuel cell control unit 100 corrects the air flow rate sensing value and the air pressure sensing value is now described with reference to FIG. 4.

FIG. 4 illustrates a process in which a fuel cell control unit corrects the air flow rate sensing value and the air pressure sensing value according to an embodiment of the present disclosure. Ambient air temperature sensor (31) and atmospheric pressure sensor (32) may be included in the fuel cell system of FIG. 1.

Referring to FIG. 4, the fuel cell control unit 100 may calculate an ambient air temperature correction value according to an ambient air temperature sensing value output from an ambient air temperature sensor (31). The fuel cell control unit 100 may correct the air flow rate sensing value by applying the calculated ambient air temperature correction value. More specifically, the fuel cell control unit 100 may multiply the air flow rate sensing value with the ambient air temperature correction value to calculate a corrected air flow rate sensing value (S101).

The fuel cell control unit 100 may determine an APC degree-of-opening compensation value on the basis of the ratio of degree of opening of the air pressure controller 19 (FIG. 1), and the fuel cell control unit 100 may determine an atmospheric pressure compensation value according to an atmospheric pressure sensing value output from an atmospheric pressure sensor (32). In particular, the fuel cell control unit 100 may correct the air pressure sensing value by applying the APC degree-of-opening compensation value and the atmospheric pressure compensation value. In another embodiment, the fuel cell control unit 100 may subtract the APC degree-of-opening compensation value from the air pressure sensing value (S102), and the fuel cell control unit 100 may add the atmospheric pressure compensation value to the resulting value calculated in the operating step S102. Thus, a corrected air pressure sensing value is calculated in the operating step S103.

A process in which the fuel cell control unit 100 determines an expected rotational speed with according to the corrected air flow rate sensing value and the corrected air pressure sensing value with reference to the rotational speed map is now described with reference to FIG. 5.

FIG. 5 illustrates a process in which a fuel cell control unit determines an expected motor rotational speed with reference to a rotational speed map according to an embodiment of the present disclosure.

Referring to FIG. 5, the fuel cell control unit 100 may determine, with reference to the first rotational speed map, that a rotational speed corresponding to the corrected air flow rate sensing value is a first map rotational speed. The fuel cell control unit 100 may determine, with reference to the second rotational speed map, that a rotational speed corresponding to the corrected air pressure sensing value is a second map rotational speed. The fuel cell control unit 100 may then configure the average of the first map rotational speed and the second map rotational speed as the expected rotational speed of the motor 21.

The fuel cell control unit 100 may then transmit a command regarding the speed of the motor 21 and the expected rotational speed of the motor 21 to the air compressor control unit 200. Accordingly, if an anomaly has occurred in connection with determining the current rotational speed of the motor 21, the air compressor control unit 200 may control driving of the motor 21 on the basis of the command regarding the speed of the motor 21 and the expected rotational speed of the motor 21.

Figure 6:
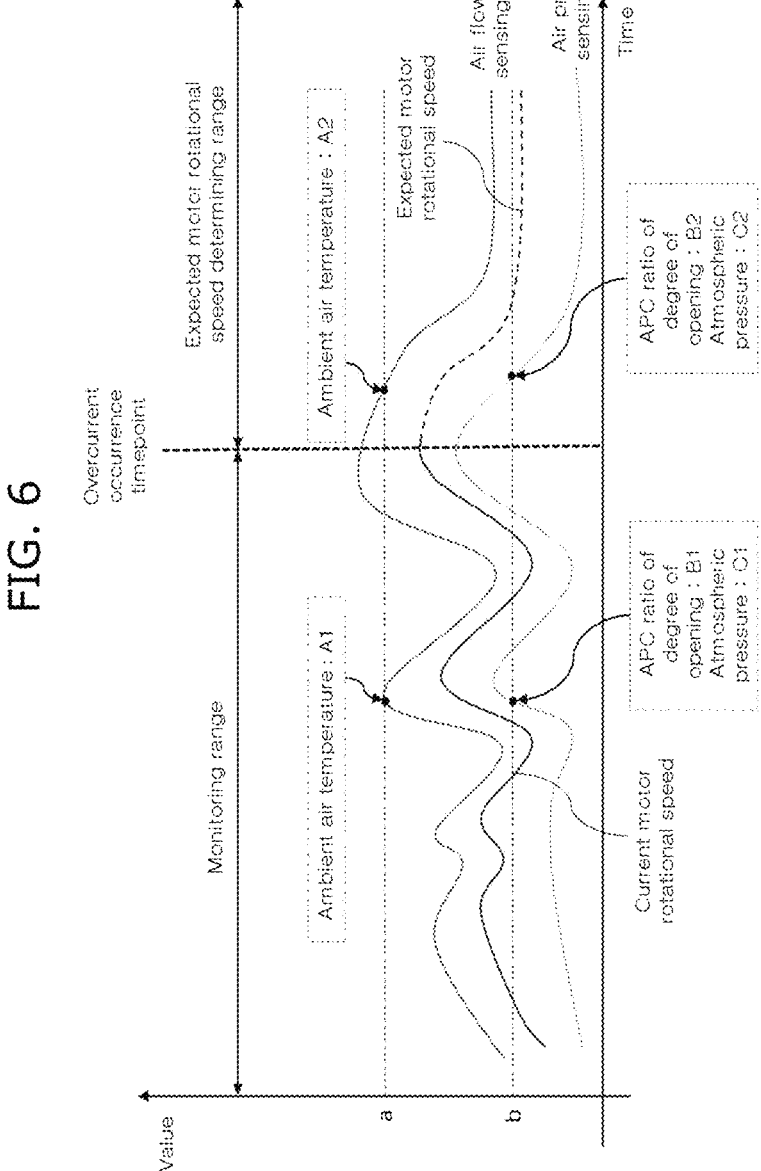
FIG. 6 is a graph of a motor rotational speed, an air flow rate sensing value, and an air pressure sensing value according to an embodiment of the present disclosure.

FIG. 6 is a graph of a motor rotational speed, an air flow rate sensing value, and an air pressure sensing value according to an embodiment of the present disclosure.

Referring to FIG. 6, before an overcurrent occurs in the air compressor 14, the fuel cell control unit 100 may monitor the current rotational speed of the motor 21, the air flow rate sensing value, and the air pressure sensing value, thereby generating a rotational speed map. When an overcurrent occurs in the air compressor 14, the air compressor control unit 200 may transmit overcurrent occurrence information to the fuel cell control unit 100. The fuel cell control unit 100 may then determine the expected rotational speed of the motor 21 according to the air flow rate sensing value and the air pressure sensing value with reference to the rotational speed map, and may transmit the result of determination to the air compressor control unit 200. Accordingly, even if an overcurrent occurs in the air compressor 14, the air compressor control unit 200 may control driving of the motor 21 on the basis of the expected rotational speed of the motor 21.

Even if the air flow rate sensing value has the identical value "a", the actual air flow rate changes according to the ambient air temperature A1, A2. Therefore, when determining the expected rotational speed of the motor 21, the fuel cell control unit 100 needs to correct the air flow rate sensing value, as in FIG. 4, in view of the ambient air temperature sensing value. In addition, even if the air flow rate sensing value has the identical value "b", the actual air pressure changes according to the ratio of degree opening B1, B2 of the APC 19 and the atmospheric pressure C1, C2. Therefore, when determining the expected rotational speed of the motor 21, the fuel cell control unit 100 needs to correct the air pressure sensing value, as in FIG. 4, in view of the ratio of degree opening of the APC 19 and the atmospheric pressure sensing value.

Figure 7:
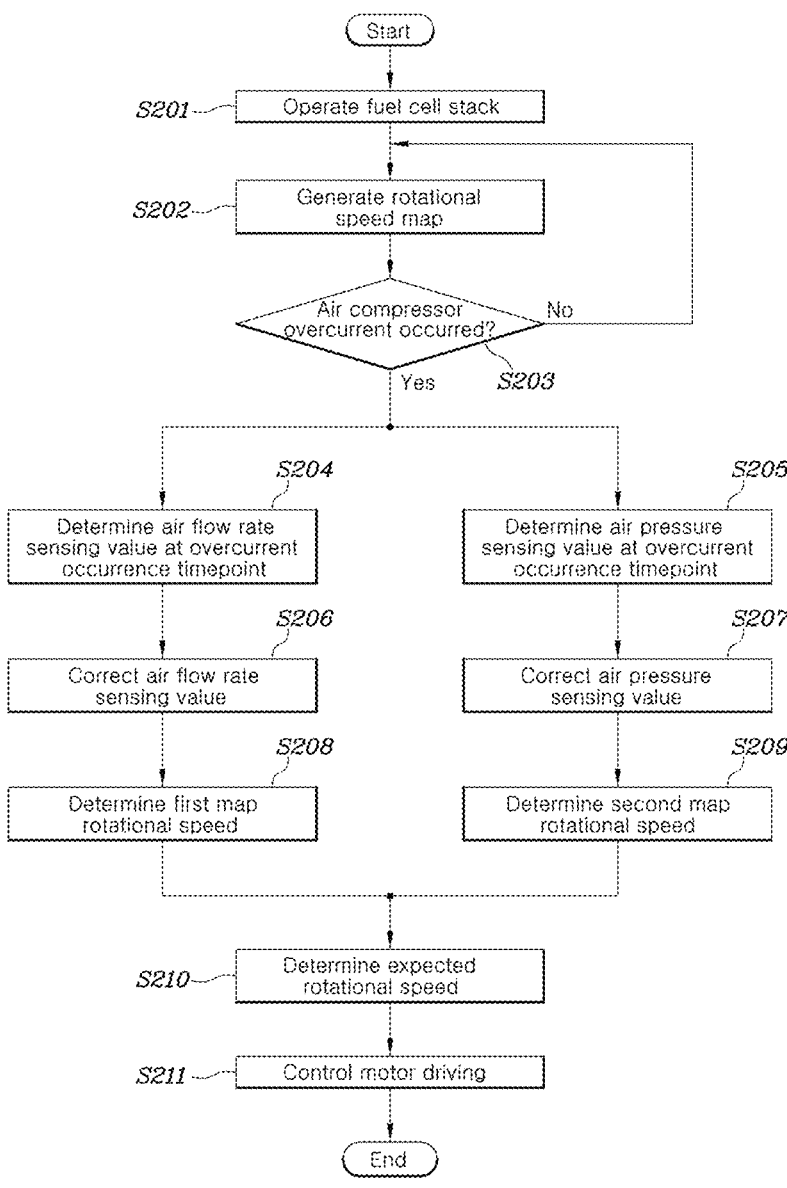
FIG. 7 is a flowchart illustrating an air compressor motor driving control method according to an embodiment of the present disclosure.

FIG. 7 is a flowchart illustrating an air compressor motor driving control method according to an embodiment of the present disclosure.

Referring to FIG. 7, the fuel cell control unit 100 may transmit a command regarding the speed of the motor 21 to the air compressor control unit 200 in order to control the operation of the fuel cell stack 10, and the air compressor control unit 200 may control driving of the motor 21 on the basis of the command regarding the speed of the motor 21 and the current rotational speed of the motor 21 (S201).

The fuel cell control unit 100 may monitor the current rotational speed of the motor 21, the air flow rate sensing value, and the air pressure sensing value, thereby generating a rotational speed map (S202). As described above, the rotational speed map may include a first rotational speed map including information regarding the rotational speed of the motor 21 corresponding to the air flow rate value, and a second rotational speed map including information regarding the rotational speed of the motor 21 corresponding to the air pressure value.

The air compressor control unit 200 may sense the electric current in the motor 21, thereby determining whether or not an overcurrent occurs in the air compressor 14 (S203).

When overcurrent occurs in the air compressor 14 (YES in S203), that is, if an anomaly occurs in connection with determining the current rotational speed of the motor 21, the fuel cell control unit 100 may determine the air flow rate sensing value and the air pressure sensing value at the timepoint at which the overcurrent has occurred (S204, S205).

The fuel cell control unit 100 may then correct the air flow rate sensing value on the basis of an ambient air temperature compensation value (S206), and may correct the air pressure sensing value on the basis of an APC degree-of-opening compensation value and an atmospheric pressure compensation value (S207).

The fuel cell control unit 100 may determine, with reference to the first rotational speed map, a first map rotational speed according to the corrected air flow rate sensing value (S208), may determine, with reference to the second rotational speed map, a second map rotational speed according to the corrected air pressure sensing value (S209), and may configure the average of the first map rotational speed and the second map rotational speed as the expected rotational speed of the motor 21 (S210).

The fuel cell control unit 100 may transmit the expected rotational speed of the motor 21 to the air compressor control unit 200, and the air compressor control unit 200 may control driving of the motor 21 on the basis of a command regarding the speed of the motor 21 and the expected rotational speed of the motor 21 (S211).

The present disclosure as described above may be implemented as codes in a computer-readable medium in which a program is recorded. The computer-readable medium includes all types of recording devices in which data readable by a computer system are stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device, and the like.

Further, the above detailed description should not be construed in a limitative sense, but should be considered in an illustrative sense in all aspects. The scope of the present disclosure should include all changes and modifications made within the equivalent scope of the present disclosure.

What is claimed is:

1. A fuel cell system comprising:
a fuel cell stack;
an air compressor comprising a motor such that introduced air is compressed and supplied to the fuel cell stack;
a first controller configured to estimate a current rotational speed of the motor based on a counter electromotive force of the motor and control driving of the motor, wherein when an abnormality is detected in determining the current rotational speed, the first controller is configured to control driving of the motor based on a speed command and an expected rotational speed of the motor; and
a second controller configured to transmit the speed command and the expected rotational speed to the first controller, wherein the second controller is configured to determine the expected rotational speed based on a rotational speed map regarding the motor, an air flow rate sensing value and an air pressure sensing value.

2. The fuel cell system of claim 1, wherein the first controller is configured to stop estimating the current rotational speed when an overcurrent occurs in the air compressor.

3. The fuel cell system of claim 1, wherein the second controller is configured to monitor the current rotational speed, the air flow rate sensing value, and the air pressure sensing value to generate the rotational speed map.

4. The fuel cell system of claim 1, wherein the second controller is configured to:
obtain corresponding rotational speeds from the rotational speed map using the air flow rate sensing value and the air pressure sensing value measured at a timepoint at which the abnormality occurs in determining the current rotational speed; and
determine the expected rotational speed based on the obtained corresponding rotational speeds.

5. The fuel cell system of claim 4, wherein the rotational speed map comprises:
a first rotational speed map comprising information regarding rotational speeds of the motor corresponding to air flow rate values; and
a second rotational speed map comprising information regarding rotational speeds corresponding to air pressure values.

6. The fuel cell system of claim 5, wherein the corresponding rotational speeds includes a first map rotational speed and a second map rotational speed,
wherein the second controller is configured to:
determine, based on the first rotational speed map, that a rotational speed corresponding to the air flow rate sensing value is the first map rotational speed;
determine, based on the second rotational speed map, that a rotational speed corresponding to the air pressure sensing value is the second map rotational speed; and
determine an average of the first map rotational speed and the second map rotational speed as the expected rotational speed.

7. The fuel cell system of claim 6, wherein the second controller is configured to:
correct the air flow rate sensing value by applying an ambient air temperature compensation value based on an ambient air temperature sensing value, and
determine, based on the first rotational speed map, a rotational speed corresponding to the corrected air flow rate sensing value as the first map rotational speed.

8. The fuel cell system of claim 6, wherein the second controller is configured to:
determine, based on a ratio of a degree of opening of an air pressure controller, a degree-of-opening compensation value;
determine, based on an atmospheric pressure sensing value, an atmospheric pressure compensation value,
correct the air pressure sensing value by applying the degree-of-opening compensation value and the atmospheric pressure compensation value; and
determine, based on the second rotational speed map, a rotational speed corresponding to the corrected air pressure sensing value as the second map rotational speed.

* * * * *